H. A. S. HOWARTH.
THRUST BEARING.
APPLICATION FILED APR. 5, 1916.
1,331,108.  Patented Feb. 17, 1920.
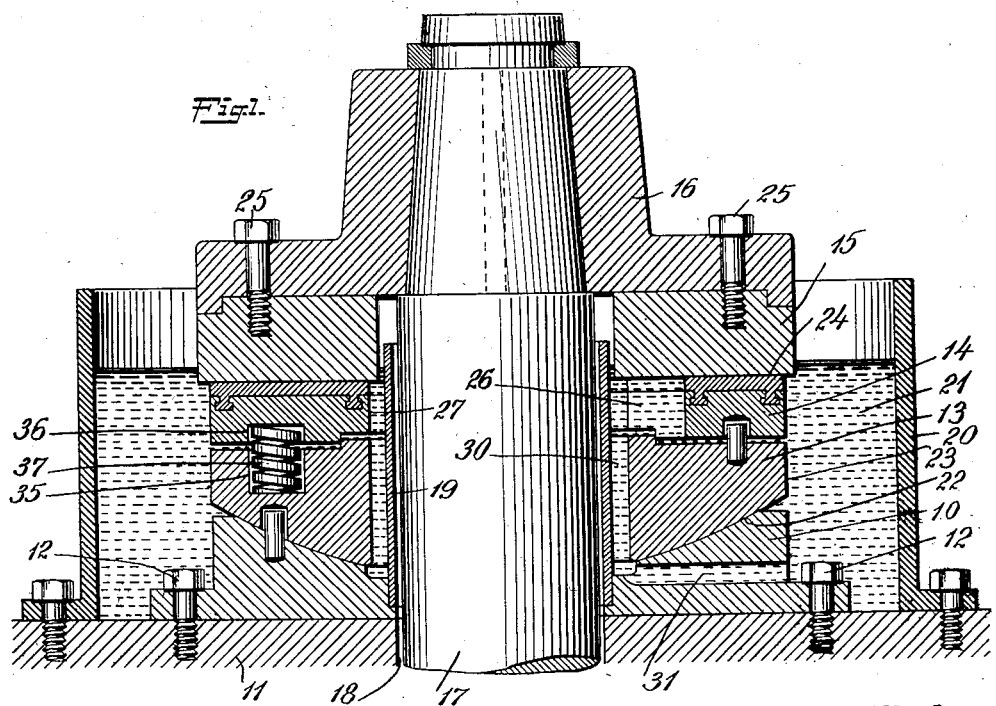
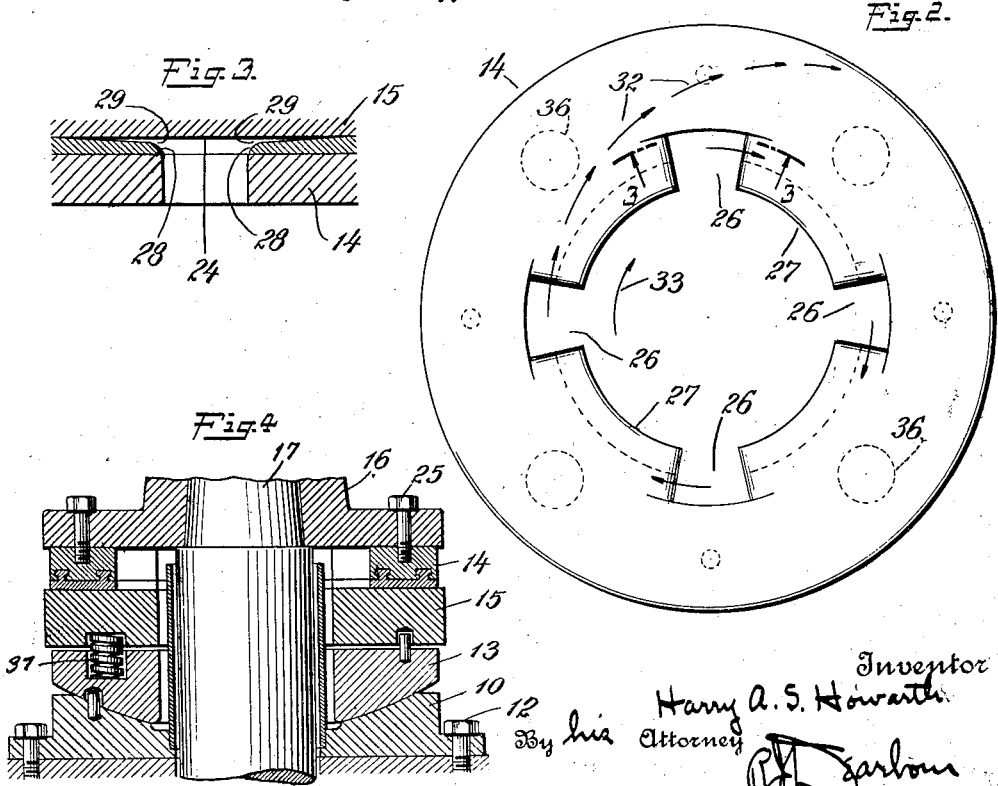
Inventor
Harry A. S. Howarth
By his Attorney

UNITED STATES PATENT OFFICE.

HARRY A. S. HOWARTH, OF PITTSBURGH, PENNSYLVANIA, ASSIGNOR TO ALBERT KINGSBURY, OF PITTSBURGH, PENNSYLVANIA.

THRUST-BEARING.

1,331,108.

Specification of Letters Patent. Patented Feb. 17, 1920.

Application filed April 5, 1916. Serial No. 88,981.

*To all whom it may concern:*

Be it known that I, HARRY A. S. HOWARTH, a citizen of the United States, and a resident of Pittsburgh, county of Allegheny, and State of Pennsylvania, have invented certain new and useful Improvements in Thrust-Bearings, of which the following is a specification, reference being had to the accompanying drawings, forming a part thereof.

My invention relates to thrust bearings, and has special reference to such as are adapted to operate at high speeds under relatively light loads.

One object of my invention is to provide a simple and durable bearing adapted for use as above indicated, that shall possess many of the advantages of both the plane annular-bearing-surface thrust collars, and bearings of the shoe type, such as, for example, form the subject matter of Patent No. 947,242, granted to Albert Kingsbury January 25, 1910. In other words, it is my aim to provide a thrust bearing including annular bearing members that shall antomatically produce by centrifugal force and aided preferably by a wedging action such a distribution and movement of the lubricant as to maintain a lubricating film between the bearing surfaces.

Other objects and advantages of my invention will be set forth hereinafter, and in order that my invention may be thoroughly understood, I will now proceed to describe the same in the following specification and then point out the novel features thereof in appended claims.

Referring to the drawings:

Figure 1 is a sectional elevation of a bearing arranged and constructed in accordance with my invention.

A plan view of one of the thrust collars apart from the remainder of the bearing is shown in Fig. 2.

Fig. 3 is a sectional detail showing a portion of the thrust collar of Fig. 2 taken on the line 3—3.

A slightly modified arrangement embodying my invention is shown in Fig. 4 which corresponds to Fig. 1.

The structure illustrated in Figs. 1, 2 and 3 comprises an annular base 10 mounted upon a stationary frame or support 11 to which it is attached by bolts 12, an equalizing ring 13, a thrust collar 14 resiliently mounted thereon, a coöperating thrust collar 15, and a thrust block 16 which is secured to the upper end of the shaft 17.

The frame or support 11 has an opening 18 through which the shaft 17 extends and the base 10 carries a sleeve 19 which loosely surrounds the shaft and coöperates with an outer wall 20 to provide an annular tank or reservoir 21 for lubricating fluid.

In the form shown, the base has a spherically curved surface 22 upon which the equalizing ring 13 is mounted, the bottom surface 23 of the ring corresponding in curvature to the supporting surface of the base.

The thrust collar 15 is shown with a plane annular bearing surface 24 and is attached to the thrust block 16 by bolts 25 or other suitable means.

In the form shown, the equalizing ring 13 and the collar 14 have correspondingly located recesses 35 and 36 into which interposed springs 37 extend. The springs space the collar from the ring and form a resilient mounting for the collar. The springs may be interposed directly between the base and the collar and the equalizing ring omitted if desired. Furthermore, the springs may be omitted and the collar mounted directly on the ring. The helical springs 37 are intended to represent any suitable resilient support.

The thrust collar 14 is specially constructed with a view to wedging the oil between the bearing surfaces in operation and while this collar in the structure of Fig. 1 is shown as substantially stationary, while the thrust collar 15 is attached to the rotatable member, the thrust collars, obviously, may be interchanged in position and this modification is illustrated in Fig. 4, corresponding parts being designated by the same reference characters in all the figures.

In this arrangement the springs are preferably interposed between the collar 15 but the ring 13 and as already explained either the springs or the equalizing ring may be omitted or both used as illustrated.

The thrust collar 14 has a plurality of notches or recesses 26 in its inner surface 27, said notches or recesses being shown as extending axially through the collars, although such is not necessary. The bottom of the notches are preferably curved, as clearly shown in Fig. 2 and the sides of the notches are preferably radial. One or both of the radial edges at the bearing surface are curved or inclined as indicated at 28 in Fig. 3, to provide a beveled edge or wedge opening 29 between the thrust collars at each of these points.

The thrust collars are fitted loosely over the sleeve 19 so that there is an annular lubricating-fluid passageway which communicates near the bottom of the bearing with the chamber 21 through one or more radial passages 31 in the base 10.

In operation, referring to Fig. 1, the oil lies in the notches 26 at all times, whether the bearing is in operation or not, and the bearing surfaces 24 are submerged in oil. When the bearing operates, the oil is carried by the collar 15 along the wedge-shaped spaces 29 in the direction of rotation and lubricates the inner portion of the bearing surfaces.

The centrifugal action due to the speed of rotation develops a pressure in the oil in the notches or recesses 26 which pressure is greatest at the corner formed by the bottom edge of each notch or recess and that radial edge toward which the rotating collar 15 moves. Thereby, a pressure is created, without the use of extraneous means, which causes the oil to pass outwardly across the outer portion of the bearing surfaces beyond the notches or recesses substantially as indicated by the arrows 32 in Fig. 2. The spaces 29 by reason of their wedge shape further tend to distribute the oil as it enters, thereby causing a certain amount of it to pass outwardly and lubricate the surfaces independently of the centrifugal action. Thus it is evident that the several forces unite in establishing and maintaining a complete film between the continuous as well as the interrupted portions of the bearing surfaces without the use of a pump or other extraneous means.

The oil discharged from the bearing passes into the outer portion of the chamber 21 and returns through the passages 31 and 30, so that a circulation is established.

The operation of the bearing with the collars reversed corresponds to that already described and no further detailed description is necessary. Furthermore, the notches or recesses 26 may be provided in both of the thrust collars without departing from the spirit of my invention.

While the embodiment of my invention illustrated on the drawing has been described with considerable particularity, it is to be expressly understood that the invention is not limited thereto, as the same is capable of receiving a variety of mechanical expressions some of which will readily suggest themselves to those skilled in the art. Reference is therefore to be had to the appended claims for a definition of the limits of the invention.

What I claim is:

1. A bearing comprising a thrust collar having a plane annual bearing surface, the said collar embodying means for automatically forcing lubricating fluid on to said plane annular-bearing surface.

2. A thrust bearing comprising bearing members having uninterrupted coöperating annular bearing surfaces, at least one of said members embodying means for automatically forcing lubricating fluid between said uninterrupted bearing surfaces.

3. A thrust bearing comprising a thrust collar, a coöperating thrust member having an annular bearing surface composed of a continuous portion and an adjacent portion notched and arranged to automatically force lubricating fluid between the bearing surfaces and onto the continuous portion.

4. A thrust bearing comprising a pair of coöperating thrust collars, at least one of which has a continuous annular bearing-surface portion and an adjacent bearing-surface portion interrupted and arranged to automatically force lubricating fluid between the collars and onto the continuous surface portion.

5. A thrust bearing comprising a pair of thrust collars having coöperating bearing surfaces with notches in the inner edge of at least one of the bearing surfaces, said notches having beveled edges to provide wedge-shaped openings from which lubricating fluid is automatically forced between the collars.

6. A thrust bearing comprising a pair of thrust collars having coöperating bearing surfaces and bevel edge notches in the inner portion of at least one of the collars forming pockets from which lubricating fluid is wedged between the bearing surfaces and centrifugally supplied to the outer portions thereof when the bearing is operating.

7. A thrust bearing comprising a pair of thrust collars having coöperating continuous annular bearing surfaces, and notches in the inner edge of at least one of the collars forming pockets to which lubricating fluid is centrifugally supplied during the operation of the bearing, said notches having beveled edges from which lubricating fluid is automatically forced between the collars.

8. A thrust bearing comprising a thrust collar, a coöperating thrust member having a continuous annular bearing surface and an adjacent surface notched to provide means for automatically wedging lubricating fluid between the bearing surfaces, and equalizing means for supporting one of the thrust members.

9. A thrust bearing comprising a thrust collar, a coöperating thrust member having a continuous annular bearing surface and a notched adjacent surface arranged to automatically wedge lubricating fluid between the bearing surfaces, and resilient means for supporting one of the thrust members.

10. A thrust bearing comprising a thrust collar, a coöperating thrust member having a continuous annular bearing surface and a notched adjacent surface arranged to automatically wedge lubricating fluid between the bearing surfaces, a stationary support and interposed springs between the support and one of the thrust members.

11. A thrust bearing comprising a pair of thrust collars having coöperating continuous annular bearing surfaces, notches in the inner edge of at lease one of the collars forming pockets to which lubricating fluid is supplied during the operation of the bearing said notches having beveled edges from which lubricating fluid is automatically forced between the collars, a stationary support, and interposed springs between the support and one of the thrust collars.

12. A thrust bearing comprising a thrust collar having an annular bearing surface, the inner portion of said surface being interrupted by recesses in which the lubricating fluid is maintained under pressure by the centrifugal action of the rotating parts.

13. A thrust bearing comprising a thrust collar having an annular bearing surface, the inner portion of said bearing surface being interrupted by beveled-edge recesses to provide pockets in which the lubricating fluid is maintained under pressure by the centrifugal action of the rotating parts.

14. A thrust bearing comprising opposed bearing members having coöperating annular bearing surfaces, at least one of said bearing surfaces being interrupted along its inner edge by recesses from which the lubricating fluid is forced between said bearing surfaces by pressure developed by the centrifugal action of the rotating parts.

15. A thrust bearing comprising opposed bearing members having coöperating annular bearing surfaces, at least one of said bearing surfaces being interrupted along its inner edge by beveled-edge recesses, said recesses providing pockets from which the lubricating fluid is forced between said bearing surfaces by the wedge action of said beveled edges and the pressure developed by the centrifugal action of the rotating parts.

In witness whereof, I have hereunto set my hand this 31st day of March, 1916.

HARRY A. S. HOWARTH.